United States Patent
Nicholson

(10) Patent No.: US 10,234,631 B2
(45) Date of Patent: Mar. 19, 2019

(54) PREVENTING DELAMINATION OF A COATING ON AN OPTICAL FIBER WHEN STRIPPING THE FIBER

(71) Applicant: OFS Fite, LLC, Norcross, GA (US)

(72) Inventor: Jeffrey W Nicholson, Warren, NJ (US)

(73) Assignee: OFS FITEL, LLC, Norcross, GA (US)

( * ) Notice: Subject to any disclaimer, the term of this patent is extended or adjusted under 35 U.S.C. 154(b) by 244 days.

(21) Appl. No.: 15/079,121

(22) Filed: Mar. 24, 2016

(65) Prior Publication Data

US 2017/0168239 A1     Jun. 15, 2017

Related U.S. Application Data

(60) Provisional application No. 62/266,989, filed on Dec. 14, 2015.

(51) Int. Cl.
*G02B 6/25* (2006.01)
*G02B 6/245* (2006.01)

(52) U.S. Cl.
CPC ............... *G02B 6/25* (2013.01); *G02B 6/245* (2013.01)

(58) Field of Classification Search
CPC .................................. G02B 6/25; G02B 6/245
See application file for complete search history.

(56) References Cited

U.S. PATENT DOCUMENTS

| RE30,342 E | 7/1980 | Perrino |
|---|---|---|
| 4,271,729 A | 6/1981 | Perrino et al. |
| 4,621,754 A | 11/1986 | Long et al. |
| 5,298,105 A | 3/1994 | Dorsey |
| 6,643,448 B1 | 11/2003 | Brewer et al. |
| 2012/0125167 A1* | 5/2012 | Henke ............ G02B 6/25 83/13 |

(Continued)

FOREIGN PATENT DOCUMENTS

| JP | 54058449 | * | 5/1979 |
|---|---|---|---|
| JP | 63-084738 A | | 4/1988 |
| JP | 09-211235 A | | 8/1997 |

(Continued)

OTHER PUBLICATIONS

Delaware Diamond Knives, Fiber Optic Cleaving Tools, web page advertisement (Dec. 2015).

(Continued)

*Primary Examiner* — John C Hong
(74) *Attorney, Agent, or Firm* — Leo Zucker, Esq.

(57) ABSTRACT

A length of a coating on an optical fiber is cut and stripped from an end of the fiber by supporting the fiber in confronting relation to a cutting edge on one or more blades. Each blade is positioned so that its cutting edge cuts into the coating without delaminating the coating from an underlying fiber cladding by providing the cutting edge with sufficient sharpness. The coating is sliced around the circumference of the fiber by either rotating the fiber about its axis so that the cutting edge of each blade slices the coating around a corresponding portion of the circumference of the fiber, or rotating the cutting edge of each blade about the fiber axis so that the cutting edge slices the coating around a corresponding portion of the circumference of the fiber. A cut length of the coating is then removed from the end of the fiber.

10 Claims, 11 Drawing Sheets

(56) References Cited

U.S. PATENT DOCUMENTS

2014/0338195 A1 11/2014 Zhao
2016/0008996 A1* 1/2016 Dunn ..................... G02B 6/25
83/879

FOREIGN PATENT DOCUMENTS

| JP | 2000-292623 A | 10/2000 |
| JP | 2002-258060 A | 9/2002 |
| JP | 2010-250167 A | 11/2010 |

OTHER PUBLICATIONS

Thorlabs, Fiber Optic Cleavers, web advertisement, two pages (Jan. 2016).
Jonard Tools, JIC-175—Ergonomic Fiber Optic Stripper, web advertisement (Jan. 2016).

* cited by examiner

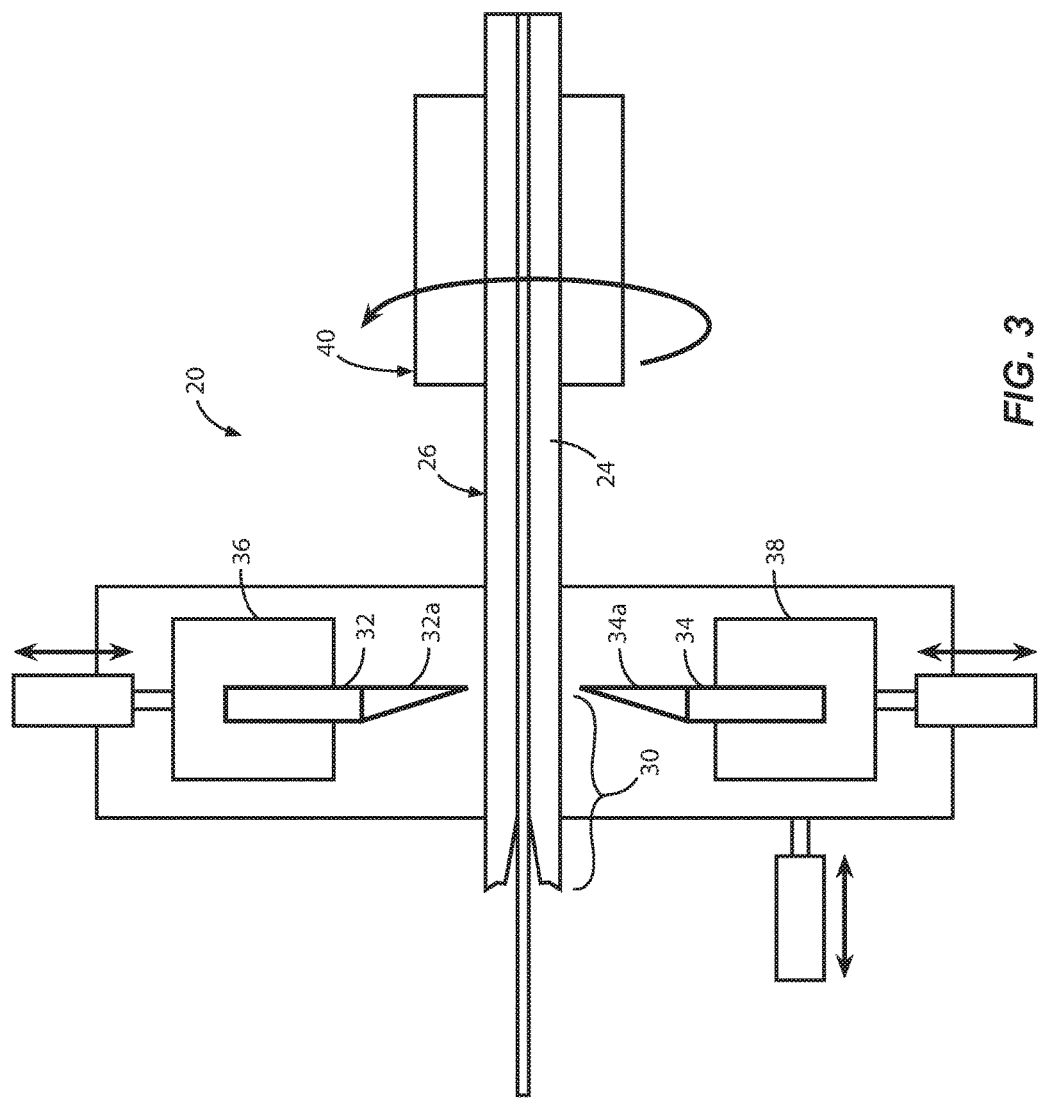

PREVENTING DELAMINATION OF A COATING ON AN OPTICAL FIBER WHEN STRIPPING THE FIBER

CROSS REFERENCE TO RELATED APPLICATION

This application claims priority under 35 U.S.C. § 119(e) of U.S. Provisional Patent Application No. 62/266,989 filed Dec. 14, 2015, titled "Ruby Blades and Rotating Fiber for Delamination Free Strip Edges," which is incorporated by reference in its entirety.

BACKGROUND OF THE INVENTION

Field of the Invention

The present invention is directed to a method and apparatus for cutting and stripping optical fibers.

Discussion of the Known Art

When manufacturing a high power cladding pumped fiber laser, a length of a polymer coating on the fiber is cut and stripped from one end of the fiber, and the stripped end is recoated. When the fiber operates as a laser, substantial optical power is pumped through the fiber cladding and interacts with the coating. Therefore, when the coating is stripped off the end of the fiber, the edge of the coating that remains on the fiber and the underlying cladding must be smooth and clean to keep the operating temperature of the fiber laser relatively low. Defects at an edge of the coating or the recoating, or any particles present on the surface of the fiber cladding, will induce heating and cause the fiber laser to fail.

While it is possible to use a liquid or acid to remove the coating (see, e.g., U.S. Pat. No. 5,298,105 (Mar. 29, 1994)), acid stripping can raise reliability issues over the long term. Therefore, mechanical tools are typically used for cutting and stripping coated or jacketed optical fibers. Such tools are commercially available from, inter alia, Jonard Tools, Tuckahoe, N.Y. 10707, and Micro Electronics, Inc., Seekonk, Mass. 02771. See also U.S. Pat. No. Re. 30,342 (Jul. 22, 1980), U.S. Pat. No. 4,271,729 (Jun. 9, 1981), and U.S. Pat. No. 6,643,448 (Nov. 4, 2003), and Pub. No. US 2014/0338195 (Nov. 20, 2014), all of which are incorporated by reference.

As mentioned, after the coating is stripped from the end of the fiber, the edge of the coating left on the fiber must be clean and smooth so the fiber can operate as a laser at high power without overheating. If a mechanical tool is used and the tool blades are not sufficiently sharp, the coating will be crushed rather than cleanly sliced, and regions will be produced where the coating separates or delaminates from the fiber cladding.

FIG. 1 is a microscope image of an end of a coated fiber 10, showing a delamination region at a cut edge 18 of the coating 12 after a length of the coating was cut and stripped from the end of the fiber by a conventional tool, leaving a stripped region 14. After the fiber 10 is spliced to another optical fiber or otherwise processed, the stripped region 14 is typically recoated with a low index polymer. During operation of the fiber 10 as a laser, pump light from a multi-mode optical diode laser or other source is guided by a boundary 16 between the cladding 14 and the coating 12 on the fiber 10. Therefore, any delamination or tear at the cut edge 18 of the coating will disturb the properties of the boundary 16 and cause the fiber 10 to overheat during laser operation.

Tools that use ruby or diamond blades to cleave an optical fiber to obtain a mirror flat surface on a terminating end of the fiber, are commercially available from, inter alia, Thorlabs Inc., Newton, N.J. 07860 and Delaware Diamond Knives, Wilmington, Del. 19805. See also U.S. Pat. No. 4,621,754 (Nov. 11, 1986) which is incorporated by reference. Notwithstanding, a need exists for a method and apparatus for cutting and stripping a coating from an end of an optical fiber so that the coating remaining on the fiber is free of tears or delamination.

SUMMARY OF THE INVENTION

According to the invention, a method of cutting and stripping a coating from an optical fiber, includes supporting a coated optical fiber in confronting relation to a cutting edge of one or more blades, and positioning each blade so that its cutting edge cuts into the coating, while avoiding delaminating the coating from an underlying fiber cladding by providing the cutting edge with sufficient sharpness. The coating around the circumference of the fiber is sliced by either (a) rotating the fiber about its axis while each blade maintains contact with the coating, whereby the cutting edge of the blade slices the coating over a corresponding portion of the circumference of the fiber, or (b) rotating the cutting edge of each blade about the fiber axis while the blade maintains contact with the coating, whereby the cutting edge of the blade slices the coating over a corresponding portion of the circumference of the fiber. A cut length of the coating is then removed from an end of the fiber.

According to another aspect of the invention, apparatus for stripping a length of a coating from an end of an optical fiber, includes one or more blades each having a cutting edge, a first mount arrangement constructed to support and adjust the position of the blades, and a second mount arrangement constructed to support a length of the fiber in confronting relation to the cutting edges of the blades. The first mount arrangement is operative to position the blades with respect to the length of the fiber, and the cutting edges of the blades are sufficiently sharp to cut the coating to a determined depth without delaminating the coating from an underlying fiber cladding. The second mount arrangement is operative to rotate the fiber about its axis so that, after cutting the coating, the cutting edges of the blades slice the coating around the circumference of the fiber. The second mount arrangement is also operative to translate the fiber in a direction away from the blades so that the blades engage and strip the coating from the end of the fiber without tearing or delaminating the coating remaining on the fiber.

According to another aspect of the invention, apparatus for stripping a length of a coating from an end of an optical fiber, includes one or more blades each having a cutting edge, a first mount arrangement constructed to support and adjust the position of the blades, and a second mount arrangement constructed to support a length of the fiber in confronting relation to the cutting edges of the blades. The first mount arrangement is operative to (i) position the blades with respect to the length of the fiber, and the cutting edges of the blades are sufficiently sharp to cut the coating to a determined depth without delaminating the coating from an underlying fiber cladding, and (ii) rotate the blades about the axis of the fiber so that the cutting edges of the blades slice the coating around the circumference of the fiber. The second mount arrangement is also operative to translate the fiber in a direction away from the blades so that the blades engage and strip the coating from the end of the fiber without tearing or delaminating the coating remaining on the fiber.

For a better understanding of the invention, reference is made to the following description taken in conjunction with the accompanying drawing and the appended claims.

BRIEF DESCRIPTION OF THE DRAWING FIGURES

In the drawing:

FIG. 3 is a plan view as in FIG. 2, wherein a microscope in the apparatus of FIG. 2 is omitted for clarity, and showing an end length of an optical fiber from which a coating is to be stripped by the apparatus;

Figure 2:
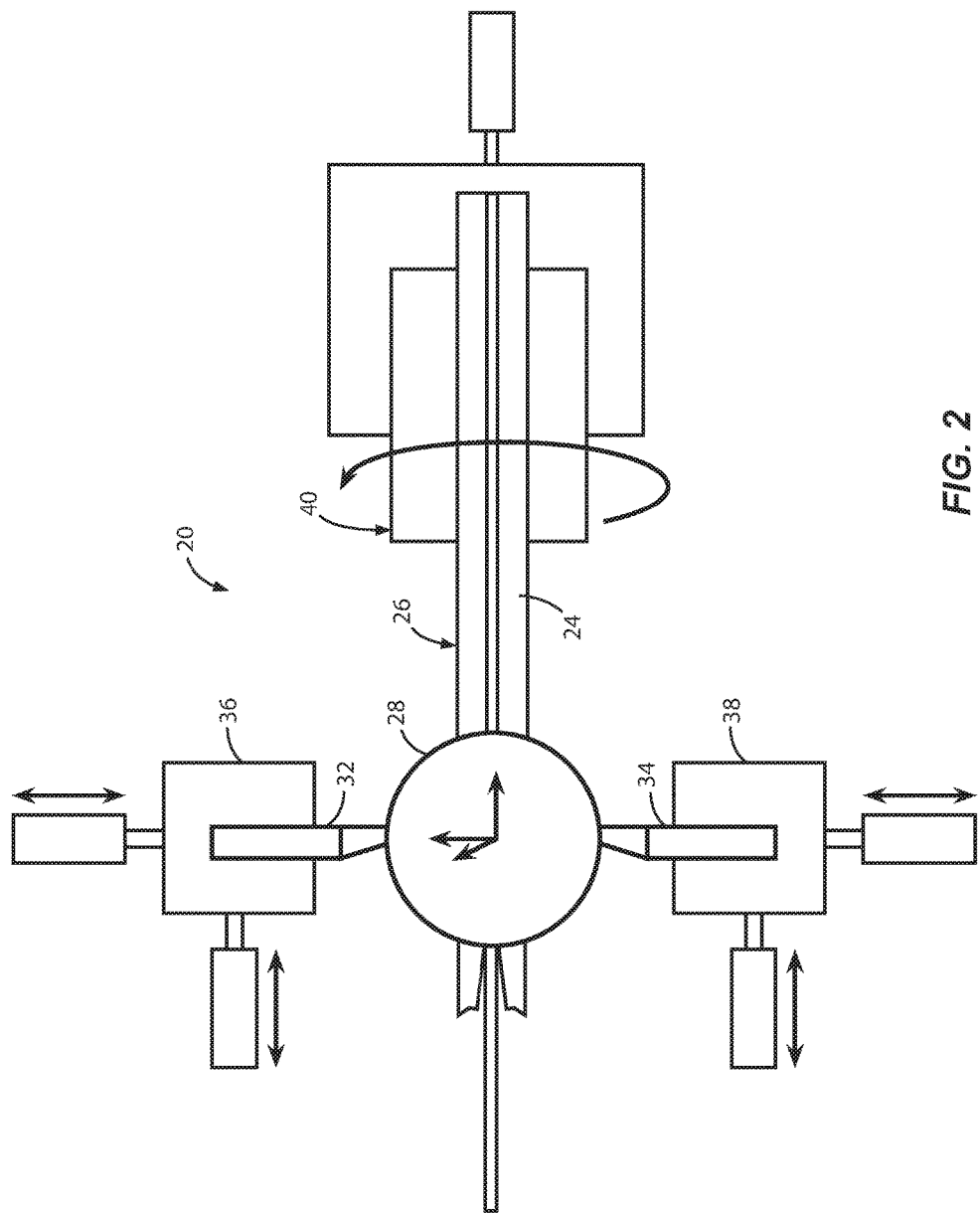
FIG. 2 is a plan view of a first embodiment of apparatus for stripping a coating from an optical fiber, according to the invention.
Figure 5:
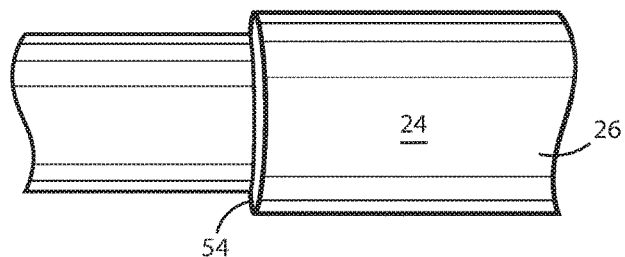
Figure 6:
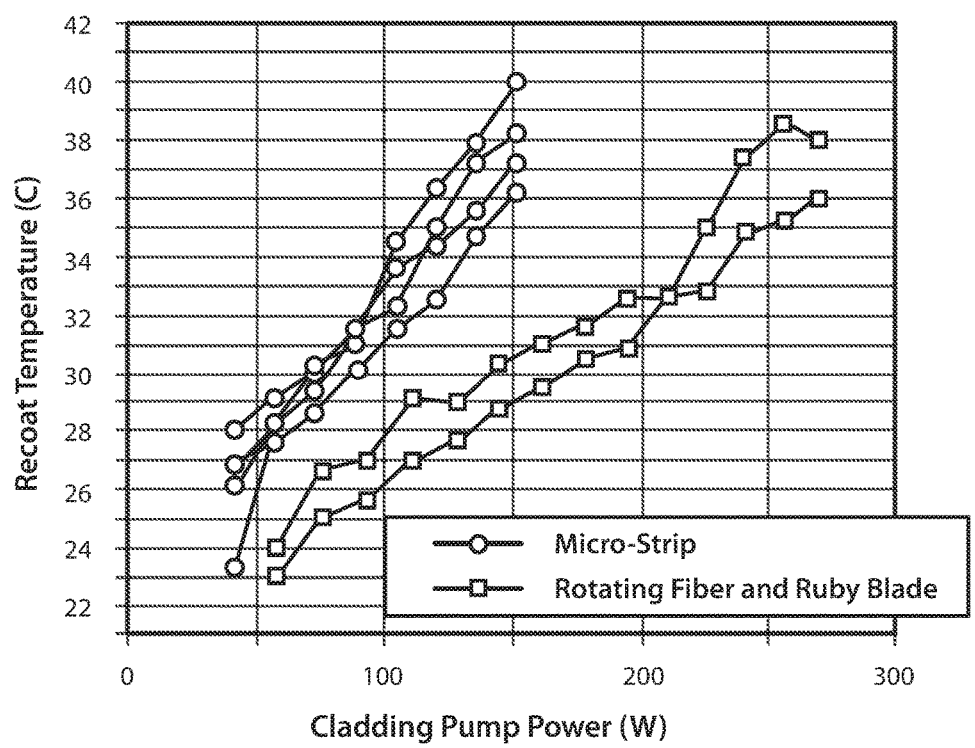
Figure 7:
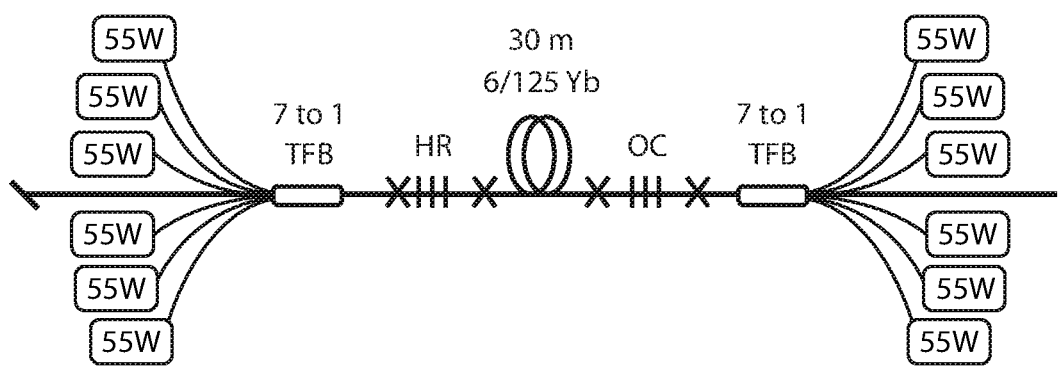
Figure 8:
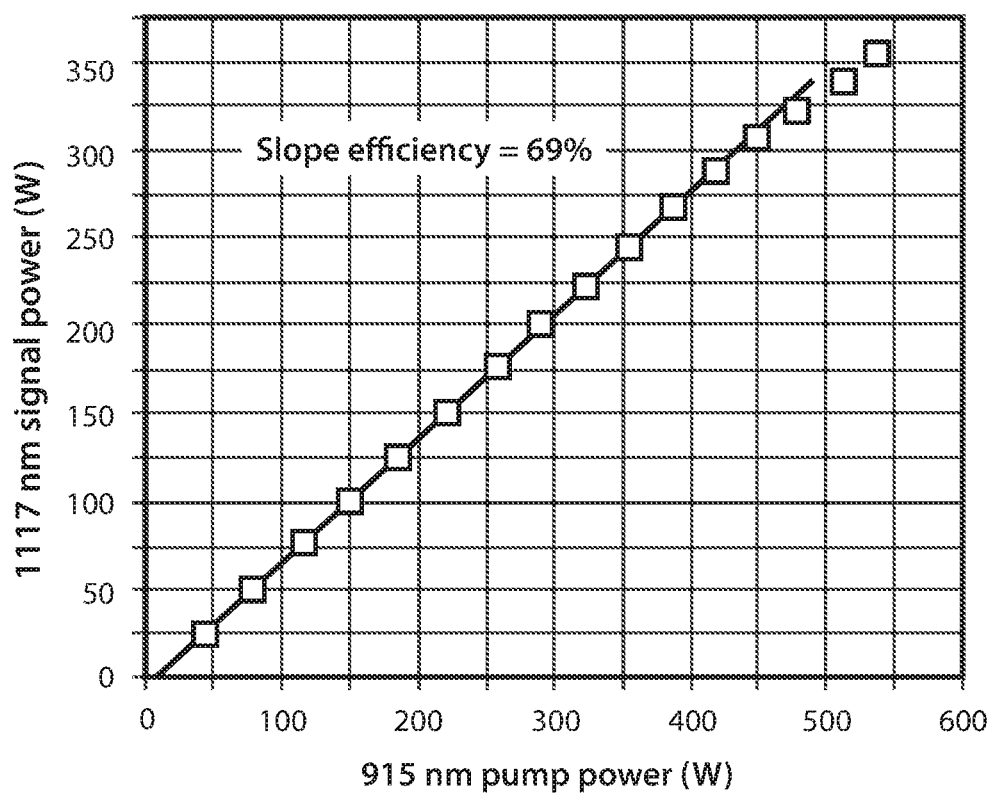
Figure 9:
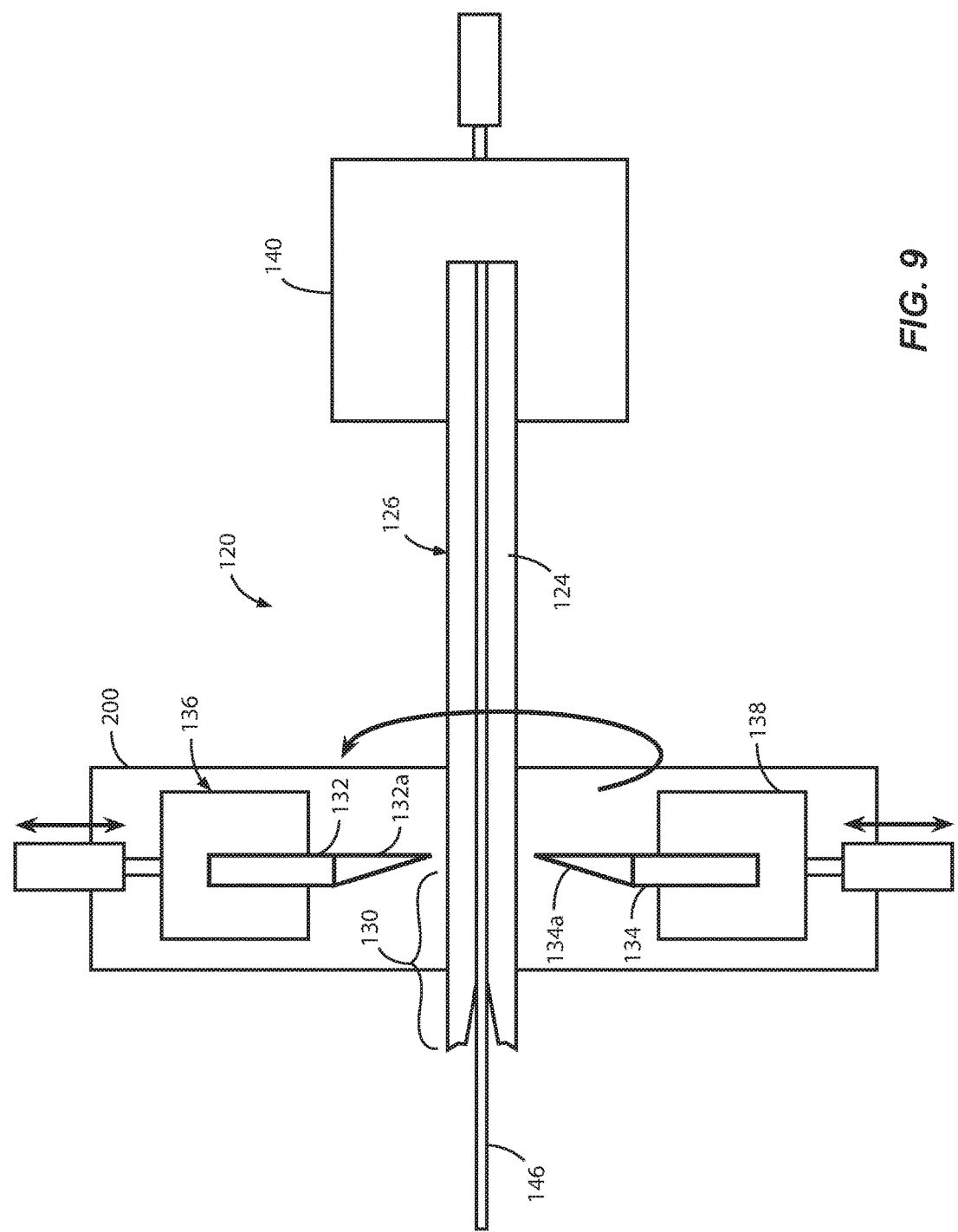

FIGS. 4(a) to 4(d) illustrate steps performed by the apparatus of FIGS. 2 and 3 when cutting and stripping the coating from the optical fiber, according to the invention;

FIG. 5 is a microscope view of an end of an optical fiber from which a fiber coating has been cut and stripped according to the invention;

FIG. 6 is a plot showing recoat temperatures of fiber lasers that were stripped by the use of a conventional tool, and fiber lasers that were stripped by the use of the inventive apparatus;

FIG. 7 is a schematic diagram of a pumped laser cavity constructed with optical fibers whose ends were stripped according to the invention;

FIG. 8 is plot showing signal output power versus pump power for the laser cavity in FIG. 7; and FIG. 9 is a plan view of a second embodiment of apparatus for stripping a coating from an optical fiber, according to the invention.

DETAILED DESCRIPTION OF THE INVENTION

The present invention is directed to a method and apparatus for cutting and stripping a coating from an end of an optical fiber so that the cut edge of the coating remaining on the fiber is not torn, and is not delaminated from the underlying fiber cladding. The invention enables the production of high power, cladding pumped optical fiber lasers having superior thermal performance.

In a disclosed embodiment, a coated optical fiber is supported lengthwise between cutting edges of a pair of cleaved ruby blades. The blades are positioned to cut into the fiber coating to a determined depth, and are sufficiently sharp to avoid crushing the coating. The fiber is rotated about its axis, or, alternatively, the blades are rotated about the axis of the fiber, so that the cutting edges of the blades slice the coating cleanly over the circumference of the fiber. The fiber is then translated or pulled in a direction away from the blades, so that the blades engage and strip a cut length of the coating from the fiber without tearing or delaminating the coating remaining on the fiber.

In particular;

1. The cutting edges of the blades are sharp enough to cut and slice into the fiber coating without crushing the coating, or inducing a load high enough to delaminate the coating from the underlying fiber cladding.

2. The initial cut by the blades into the fiber coating is sufficiently deep to prevent the coating remaining on the fiber from being torn or delaminating from the cladding when the cut length of coating is stripped from the end of the fiber. Direct physical contact between the cutting edges of the blades and the surface of the fiber cladding is preferably avoided so as not to degrade the strength of the cladding.

3. A conventional (e.g., USB) microscope and an associated display can be provided to allow an operator to observe the depth of the initial cut into the fiber coating and subsequent steps of the inventive process.

It may also be preferable in some cases to use a conventional tool to cut and strip less than all of a desired length of the coating from the end of the fiber, and then use the inventive apparatus to cut and strip the remaining length of coating so as to avoid tearing and delaminating the coating remaining on the fiber.

FIG. 2 is a plan view of apparatus 20 for cutting and stripping, e.g., an acrylate coating 24 from an optical fiber 26 with the aid of a microscope 28, according to a first embodiment of the invention. FIG. 3 is a plan view of the apparatus 20 wherein the microscope 28 in FIG. 2 is omitted for clarity, and showing an end length 30 of the fiber 26 from which the coating 24 is to be stripped by the apparatus 20.

In the apparatus 20, a pair of blades 32, 34 are supported on associated translation mounts 36, 38 so that cutting edges 32a, 34a of the blades face one another, and the positions of the edges on the blades relative to the mounts can be finely adjusted. The blades 32, 34 may be, for example, cleaved ruby blades which are commercially available with associated holders from Thorlabs Inc. of Newton, N.J., wherein each blade is provided with a 30 degree beveled cutting edge and has a 5.2 to 5.5 mm long contact area.

Apparatus 20 also includes a rotation mount 40 that is constructed and arranged to support the optical fiber 26 to extend lengthwise between the cutting edges 32a, 34a of the blades, and to rotate the fiber 26 about its axis during operation of the apparatus 20. The microscope 28 (see FIG. 2) is disposed above the optical fiber 26 and the blades 32, 34 so that an operator can view and adjust the positions of the cutting edges 32a, 34a of the blades with respect to the fiber 26 between them. See FIGS. 4(a) to 4(d) and related text below. It will be understood that imaging and/or sensing systems other than the microscope 28 can be used to position the cutting edges 32a, 34a of the blades accurately with respect to the fiber 26 when cutting and stripping the fiber.

Also, because the end length 30 of the fiber 26 from which the coating 24 is to be stripped by the opposed blades 32, 34 is relatively short, and the fiber 26 is usually stiff enough so that any deflection is minimal, a separate mount or device at the left side of the blades 32, 34 should not be required to support the end length 30 while being cut. A conventional fiber clamp may be provided, however, if needed to hold the end length 30 steady.

Figure 4A:
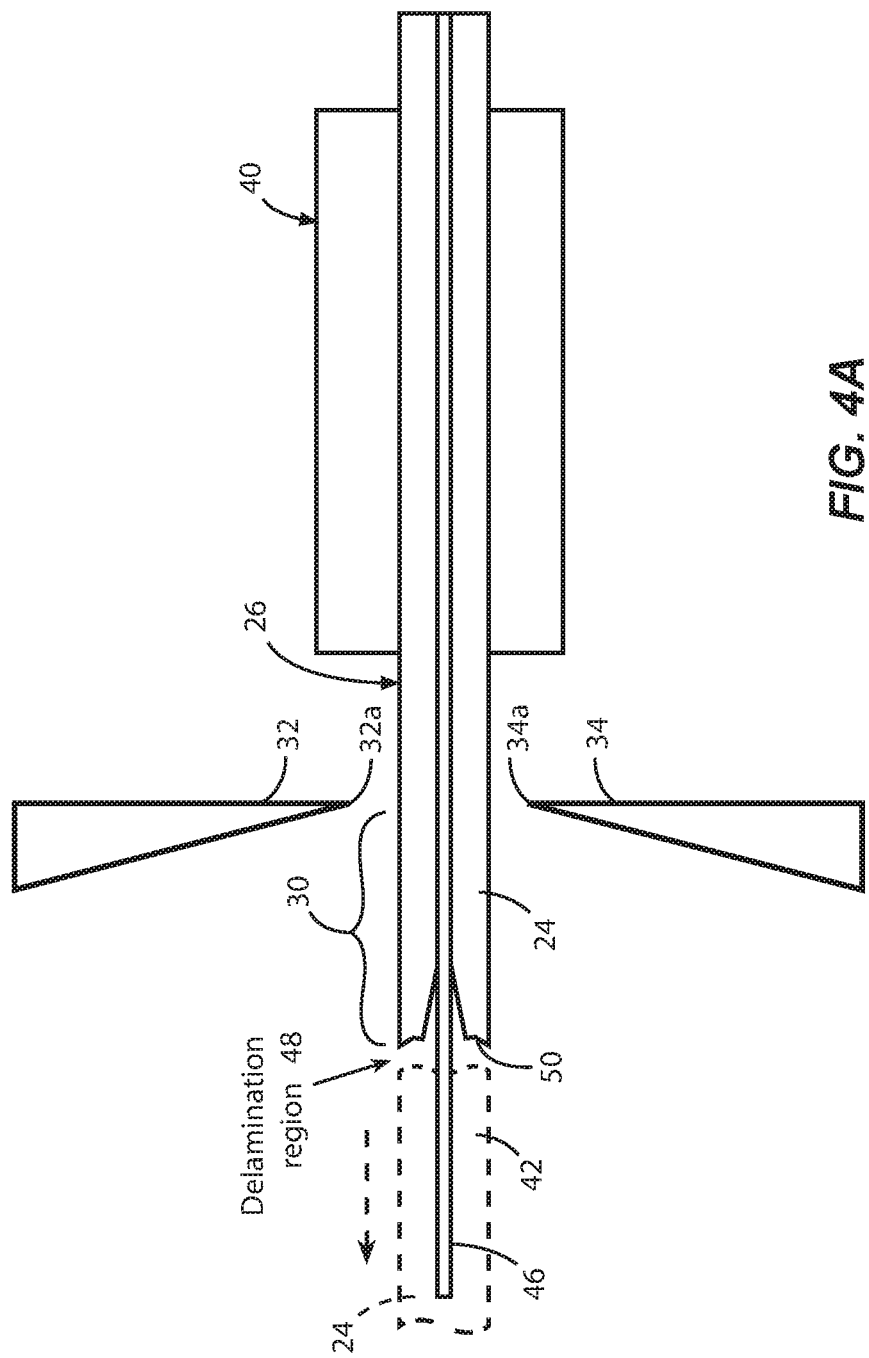

FIG. 4(a) depicts the optical fiber 26 supported by the rotation mount 40, and after a length 42 of the fiber coating 24 has been coarsely cut and removed from an end 46 of the fiber by a commercially available stripper tool. Note the resulting delamination region 48 at the cut edge 50 of the coating 24 that remains on the fiber 26.

Figure 4B:
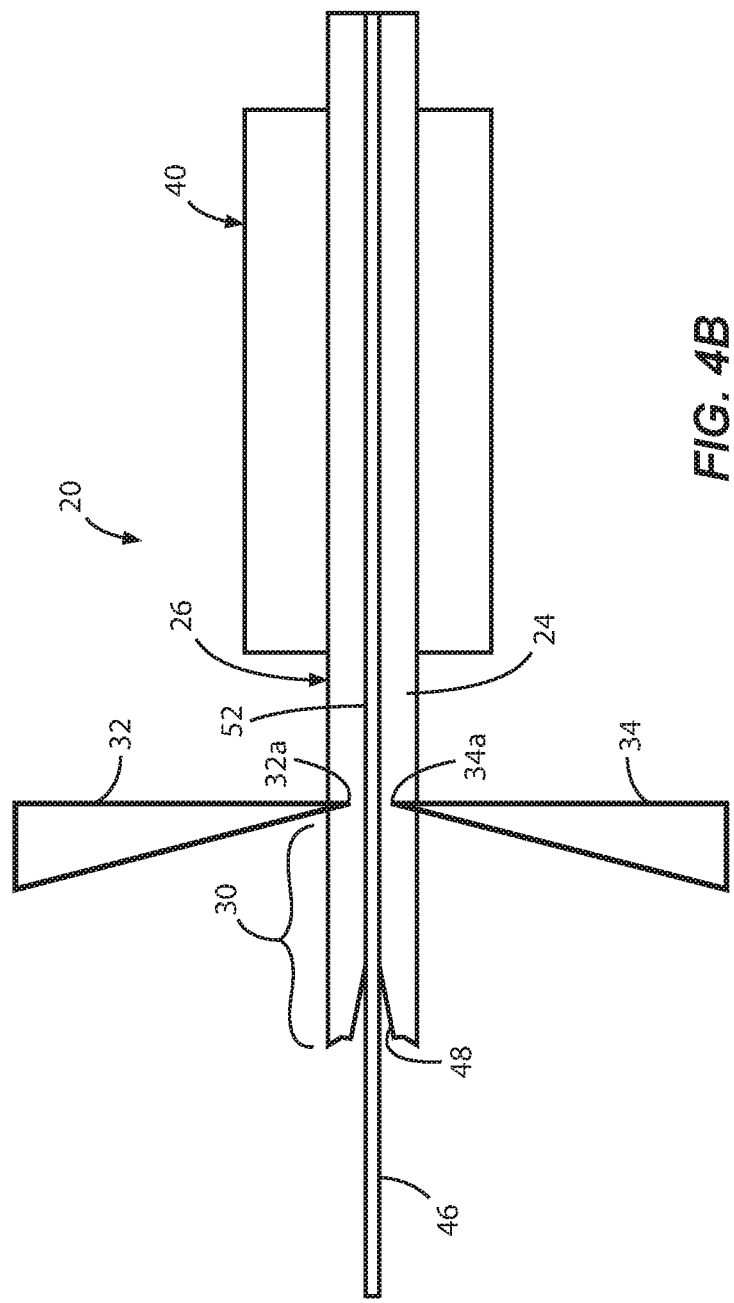

In the view of FIG. 4(b), the cutting edges 32a, 34a of the blades 32, 34 are positioned to contact the fiber coating 24 and to cut radially into the coating to a determined depth that approaches but preferably avoids direct physical contact with the underlying fiber cladding 52. It has been discovered that the edges of the cleaved blades 32, 34 disclosed above are sharp enough to cut cleanly through the coating 24 without crushing the coating, or causing the coating to delaminate from the fiber cladding 52.

Figure 4C:
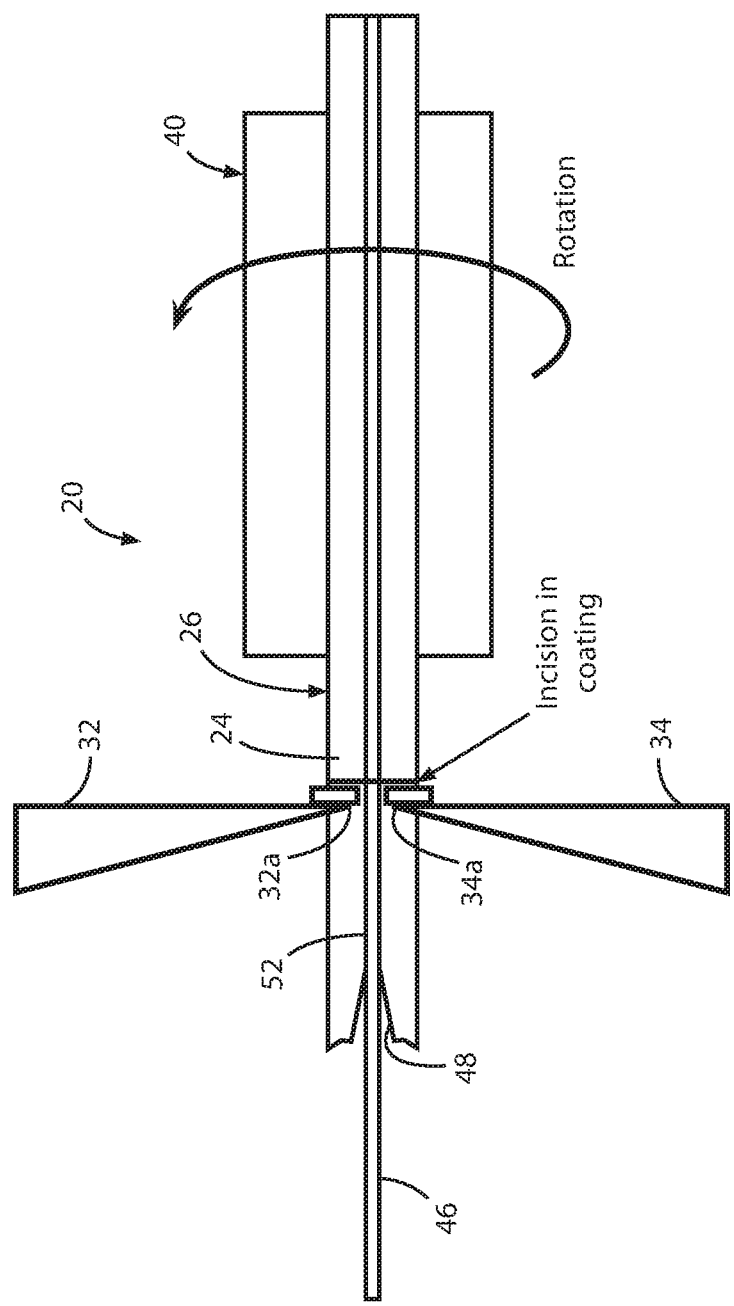

After the blades 32, 34 initially cut into the fiber coating 24, the rotation mount 40 is operated to rotate the fiber 26 about its axis, preferably by at least 180 degrees. As shown in FIG. 4(c), the cutting edges 32a, 34a of the blades together slice through the fiber coating 24 cleanly over the circumference of the fiber 26 without crushing or delaminating the coating. That is, by rotating the fiber 26 about its axis after the blades initially cut into the fiber coating 24, a clean incision that approaches the fiber cladding 52 is formed through the coating.

Figure 4D:
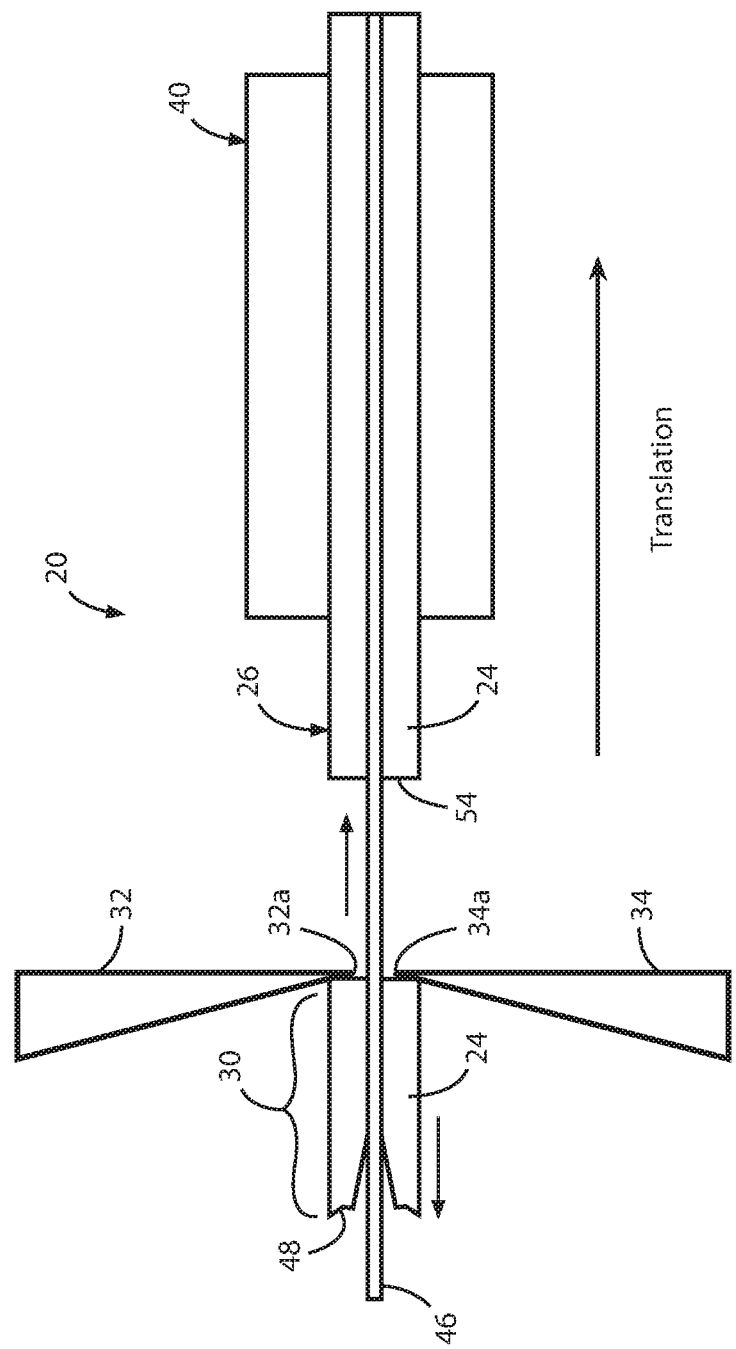

Next, as illustrated in FIG. 4(d), while the fiber 26 is held in the rotation mount 40, the mount 40 is translated in a direction away from the blades 32, 34. As a result, the blades 32, 34 engage and act to strip the cut length 30 of coating 24 including the delamination region 48 as the end 46 of the fiber 26 is withdrawn from beneath the cut length 30. As seen at the right in FIG. 4(d) and in FIG. 5, the cut edge 54 of the coating 24 that remains on the fiber 26 is clean and delamination free.

The inventive stripping method has been tested and found to work with coated fibers having a wide range of outer diameters (ODs), and with both low index and high index fibers. A test for delamination has also been developed. After cutting and stripping the fiber coating, a drop of alcohol is placed on the cut edge of the coating remaining on the fiber, and the alcohol is observed, e.g., via the microscope 30. If there is delamination, the alcohol can be seen to wick beneath the coating, and delamination regions will become clearly visible as the alcohol evaporates.

Figure 1:
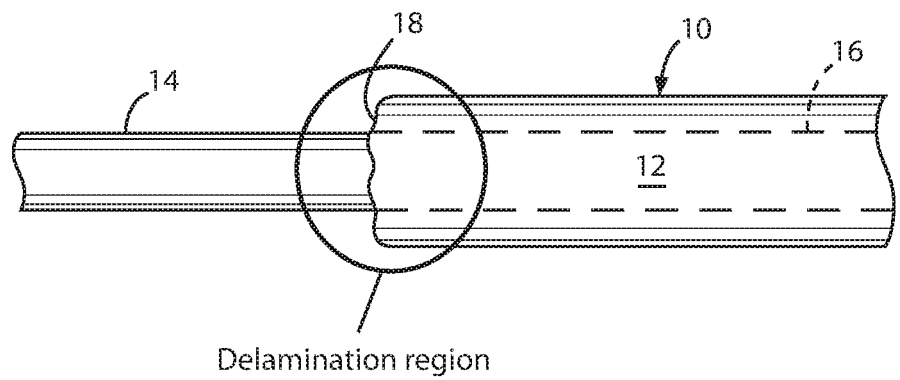
FIG. 1 is a microscope view of an end of an optical fiber from which a fiber coating has been cut and stripped by a conventional tool.

The thermal performance of low-index coated fibers whose ends were stripped and recoated, was measured in a Yb-doped cladding pumped fiber laser configuration wherein the OD of the fiber was 125 μm. Four fibers were stripped using a conventional mechanical tool and subsequently re-coated with a low index polymer, resulting in delaminated coating edges comparable to the one shown in FIG. 1. Two fibers were stripped using apparatus according to the invention and subsequently re-coated with a low-index polymer, resulting in smooth and clean coating edges without delamination, like the edge 54 in FIG. 5.

FIG. 6 is a graph showing thermal performance of the four low-index recoated fibers whose ends were initially stripped with a conventional tool, and the two recoated fibers whose ends were initially stripped with the inventive apparatus. Note that the thermal performance of the latter two fibers was significantly better than that of the fibers that were stripped conventionally. Significantly, the latter fibers could tolerate a 67% increase in pump power and maintain the same operating temperature.

Although the inventive process and apparatus as disclosed herein remove a relatively small length of coating at the end of a coated optical fiber to obtain a delamination free edge on the remaining coating, longer lengths of coating may also be removed if desired according to the invention. Moreover, fibers of any OD and having any coating thickness can be stripped using the inventive apparatus 20 by translating the mounts 36, 38 so as to adjust the positions of the cutting edges 32a, 34a of the blades 32, 34 with respect to a given fiber. Furthermore, it is also possible to use a single blade, in which case the fiber may be supported by a backing surface or substrate to prevent the fiber from deflecting when the fiber and the blade rotate relative to one another, and the cutting edge of the blade slices the coating about the circumference of the fiber.

EXAMPLE

About 30 meters of six 125 μm Yb-doped coated fibers, each having 1117 nm gratings, were stripped of their coating according to the invention, and recoated. The fibers were configured as a bi-directionally pumped cavity with 12×55 W nLight 915 nm diodes. See FIG. 7.

As shown in FIG. 8, an output power of 354 W was measured at 1117 nm, for a pump power of 539 W at 915 nm. The measured output power rolled over slightly at 300 W, possibly due to fact that the power meter used in the experiment was only rated to 300 W.

While the foregoing represents preferred embodiments of the present invention, it will be understood by persons skilled in the art that various changes, modifications, and additions can be made without departing from the spirit and scope of the invention. For example, FIG. 9 is a plan view of apparatus 120 for cutting and stripping a coating from an optical fiber, according to a second embodiment of the invention. Components in the apparatus 120 have the same reference numerals as corresponding components in the apparatus 20 in FIG. 3, increased by 100.

A basic difference between the apparatus 20 in FIG. 3 and the apparatus 120 in FIG. 9 is that translation mounts 136, 138, which support and adjust the positions of cutting blades 132, 134, are constructed and arranged to rotate in unison about the axis of the fiber by at least 180 degrees so that cutting edges 132a, 132b of the blades slice cleanly through a fiber coating 124 about the circumference of fiber 126. Both of the translation mounts 136, 138 may, for example, be mounted on a common base 200 that is configured to rotate about the axis of the fiber 126.

Other than supporting the fiber 126, the mount 140 in FIG. 9 need only operate to translate the fiber 126 in a direction away from the blades 132, 134 after the blades initially slice through the coating 124, so that the blades will act to engage and strip a cut length of coating as the end 146 of the fiber 126 is withdrawn from beneath the length of coating.

Moreover, as mentioned earlier, a single blade may be used instead of a pair of blades, and the fiber can be supported by a substrate so as to prevent the fiber from deflecting as it and the blade rotate relative to one another and the blade slices the coating around the fiber. Accordingly, the invention includes all such changes, modifications, and additions that are within the scope of the following claims.

I claim:

1. Apparatus for cutting and stripping a coating on an optical fiber from an end of the fiber, comprising:
   one or more blades each having an associated cutting edge;
   a first mount arrangement constructed to support and adjust the position of the blades;
   a second mount arrangement constructed to support a length of an optical fiber having a coating and an underlying cladding in confronting relation to the cutting edges of the blades;
   the first mount arrangement is operative to position the blades with respect to the optical fiber and to cut into the coating on the fiber to a depth that avoids contact with the underlying cladding, wherein the cutting edges of the blades are sufficiently sharp to avoid crushing the coating or inducing a load sufficient to delaminate the coating from the underlying fiber cladding;
   the second mount arrangement is operative to (i) rotate the optical fiber about the axis of the fiber so that the cutting edges of the blades slice into the coating around the circumference of the fiber, and (ii) translate the fiber in a direction away from the blades so that the blades engage and strip the coating from an end of the fiber without tearing or delaminating the coating remaining on the fiber from the underlying fiber cladding; and a system for imaging or sensing the position of the cutting edges of the blades with respect to the coating and the underlying cladding when the cutting edges slice into the coating on the fiber, so that an operator can ensure the cutting edges of the blades avoid contact with the underlying fiber cladding.

2. Apparatus according to claim 1, wherein the blades are formed of a crystalline material.

3. Apparatus according to claim 2, wherein the blades are cleaved ruby blades.

4. Apparatus according to claim 2, wherein the imaging or sensing system includes a microscope arranged for viewing the optical fiber when the fiber is disposed in confronting relation to the cutting edges of the blades.

5. Apparatus according to claim 1, including a pair of said blades supported on the first mount arrangement so that the cutting edges of the blades face one another, and the second mount arrangement is operative to rotate the optical fiber by at least 180 degrees as the cutting edges of the blades together slice into the coating on the fiber over the circumference of the fiber.

6. Apparatus for cutting and stripping a coating on an optical fiber from an end of the fiber, comprising:
one or more blades each having an associated cutting edge;
a first mount arrangement constructed to support and adjust the position of the blades;
a second mount arrangement constructed to support a length of an optical fiber having a coating and an underlying cladding in confronting relation to the cutting edges of the blades;
the first mount arrangement is operative to (i) position the blades with respect to the optical fiber and to cut into the coating on the fiber to a depth that avoids contact with the underlying cladding, wherein the cutting edges of the blades are sufficiently sharp to avoid crushing the coating or inducing a load sufficient to delaminate the coating from the underlying fiber cladding, and (ii) rotate the blades about the axis of the optical fiber so that the cutting edges of the blades slice into the coating around the circumference of the fiber; and the second mount arrangement is operative to translate the optical fiber in a direction away from the blades so that the blades engage and strip the coating from an end of the fiber without tearing or delaminating the coating remaining on the fiber from the underlying fiber cladding; and a system for imaging or sensing the position of the cutting edges of the blades with respect to the coating and the underlying cladding when the cutting edges slice into the coating on the fiber, so that an operator can ensure the cutting edges of the blades avoid contact with the underlying cladding.

7. Apparatus according to claim 6, wherein the blades are formed of a crystalline material.

8. Apparatus according to claim 7, wherein the blades are cleaved ruby blades.

9. Apparatus according to claim 6, wherein the imaging or sensing system includes a microscope arranged for viewing the optical fiber when the fiber is disposed in confronting relation to the cutting edges of the blades.

10. Apparatus according to claim 6, including a pair of said blades supported on the first mount arrangement so that the cutting edges of the blades face one another, and the first mount arrangement is operative to rotate the blades in unison about the axis of the optical fiber by at least 180 degrees as the cutting edges of the blades slice through the coating on the fiber about the circumference of the fiber.

* * * * *